United States Patent [19]

Belschner

[11] 4,343,265
[45] Aug. 10, 1982

[54] BRUSH FOR GROOMING ANIMALS

[76] Inventor: Elmer Belschner, 23510 Durand Ave., Kansasville, Wis. 53139

[21] Appl. No.: 198,703

[22] Filed: Oct. 20, 1980

[51] Int. Cl.³ .............................................. A01K 13/00
[52] U.S. Cl. ...................................... 119/83; 15/188; 15/143 R; 128/62 R
[58] Field of Search ............. 15/186, 187, 188, 143 R; 119/92, 93, 83, 84, 85, 86, 87; 132/85, 120; 128/60, 62 R, 67; D24/41, 36; D4/19

[56] References Cited

U.S. PATENT DOCUMENTS

| | | | |
|---|---|---|---|
| 804,680 | 11/1905 | Smith | 15/188 |
| 840,328 | 1/1907 | Hickson | 15/188 |
| 965,564 | 7/1910 | Coates | 128/67 |
| 1,913,462 | 6/1933 | Timar | 128/60 |
| 2,379,330 | 6/1945 | Wilensky | 15/188 X |
| 2,513,772 | 7/1950 | Amer | 128/67 |
| 2,607,064 | 8/1952 | Sullivan et al. | 15/187 |

FOREIGN PATENT DOCUMENTS 404853  1/1934  United Kingdom ............. 128/62 R

*Primary Examiner*—Peter Feldman
*Attorney, Agent, or Firm*—Thomas F. Kirby

[57] ABSTRACT

A one-piece molded neoprene brush for grooming and brushing animals such as horses and livestock comprises a generally cylindrical body portion having a flat circular lower surface from which a plurality of conically shaped integrally formed flexible teeth project and a hemispherical or dome-shaped ribbed upper surface to facilitate gripping by the user.

5 Claims, 5 Drawing Figures

BRUSH FOR GROOMING ANIMALS

BACKGROUND OF THE INVENTION

1. Field of Use

This invention relates generally to hand-held brushes or implements for grooming animals such as horses, cattle or other types of livestock.

2. Description of Prior Art

Large animals, such as horses used for riding and cattle kept for show purposes, need to be regularly groomed to remove loose hair, dandruff, scale and dirt and thereby keep their coat, in good-looking and healthy condition.

Various types of conventional curry-combs and brushes are commercially available for this purpose. Some brushes take the form of a rubber mit having short flexible teeth, and some employ suitably-mounted coiled wire springs as teeth. U.S. Pat. No. 840,328 shows a mit-type horse brush fabricated of molded rubber and having many closely spaced small short tapered teeth.

The aforesaid type of Prior art brushes and curry-combs very often have teeth which are too short to penetrate through the animal's fur down to the skin and, therefore, do not do a thorough job of grooming. Furthermore, those brushes with teeth too closely spaced prevent the accumulation of loose hair necessary for the most efficient hair removal. Also, those brushes with stiff and insufficiently flexible teeth can irritate or even injure the animal's skin, whereas those with teeth which are too flexible do not effectively dislodge loose hair, dirt and other debris. Applicant is unaware of the commercial availability of any grooming brush or implement which overcomes the aforesaid disadvantages.

SUMMARY OF THE PRESENT INVENTION

In accordance with the present invention there is provided an improved hand-held brush or implement for grooming large animals such as horses, cattle or other types of livestock. The brush, which is molded in one piece from a flexible or pliable neoprene base polymer of a desired degree of flexibility and hardness (i.e., soft, medium, hard), comprises a generally cylindrical body portion having a flat lower circular surface about 4½" in diameter from which a plurality (31) of conically-shaped integrally formed flexible teeth project and a hemispherical or dome-shaped, ribbed upper gripping surface. Each conical tooth is about ¾" long, about ¼" diameter at its widest upper end portion, and about ⅛" diameter at its narrowest and slightly flattened lower end portion. The teeth are arranged in rows on the circular surface so that the center line of each tooth is spaced about ¾" from each adjacent tooth.

Thus, the teeth are long enough and spaced far enough apart so that they penetrate through the relatively thick coating of hair on the animal to the skin surface.

The brush can be used in straight strokes or, more effectively, in circular strokes, or motion and can be used dry or with soaps, shampoos or oils, and the teeth flex or bend as pressure is applied to provide a deep rubbing, massaging and cleansing action.

The 31 life-like fingers of the brush massage and stimulate the skin, promoting better circulation, and loosen dry flaky skin conditions, and bring natural oils to surface for more coat sheen.

Whereas other grooming implements ride over hair pushing dirt down the present brush works through the hair bringing dirt and flaky skin to the surface where it can be whisked away with the brush.

The brush is excellent as a shedding tool, cannot and does not clog with hair, cannot cut or scratch, and is excellent for a shampoo or bath.

A brush in accordance with the invention does not ride over the top of the animal's coat as do prior art conventional brushes which have short, closely spaced teeth. Furthermore, the shape, placement and spacing of teeth in accordance with the invention prevent loose animal hairs from clogging the brush as is the case in prior art brushes and enable the hair collected on the brush to be easily dislodged in a compact, waffle-like mass by gravity or as by tapping the brush smartly on a surface.

The brush can be simply and easily washed with soap and water.

The brush is properly sized and contoured to fit the user's hand so it is easy to hold and use and the integrally formed circular ridges on the dome-shaped upper side prevent slippage in the user's hand as the brush is manipulated.

The brush, which is fabricated by molding in one piece from a strong, flexible, inert, non-drying, non-cracking material such as a neoprene base polymer, is preferably provided in a desired degree of flexibility and is colore-coded to indicate its hardness or degree of flexibility (i.e., soft, medium, hard). The material has long-life, high tensile strength, hardness, good elongation (stretchability) characteristics, high tearstrength, and a permanent set so that it does not lose its shape with age. Furthermore, the material of which the brush is made tends to generate static electricity when used dry and other conditions are right which causes dirt and dust to be attracted from the animal's coat to the brush.

DRAWINGS

DESCRIPTION OF A PREFERRED EMBODIMENT

Figure 1:
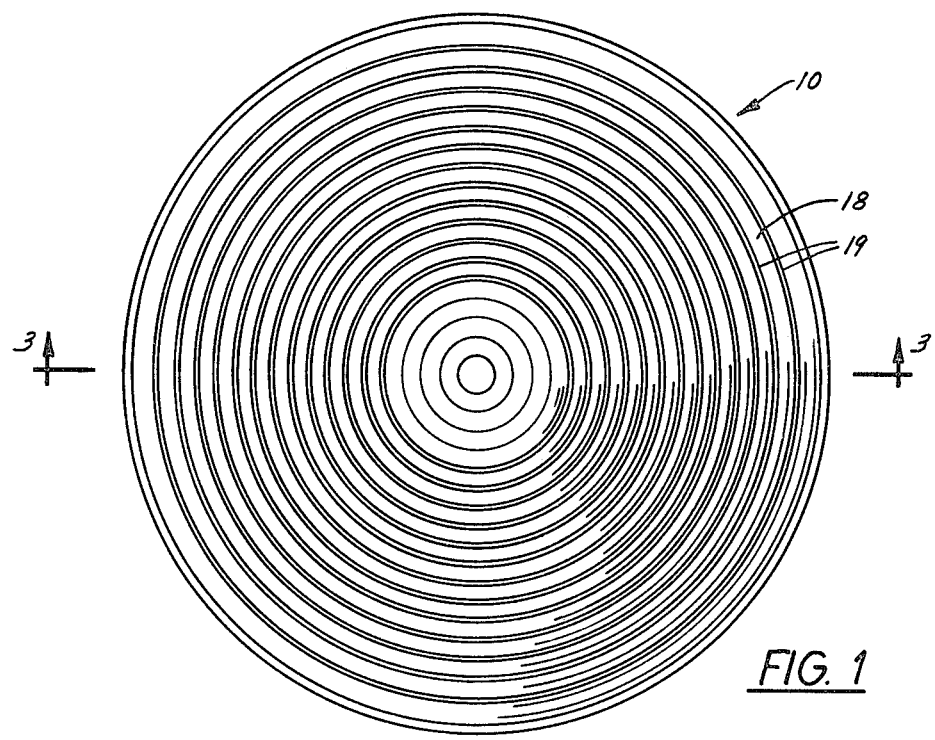
FIG. 1 is a top plan view of a brush in accordance with the invention.
Figure 2:
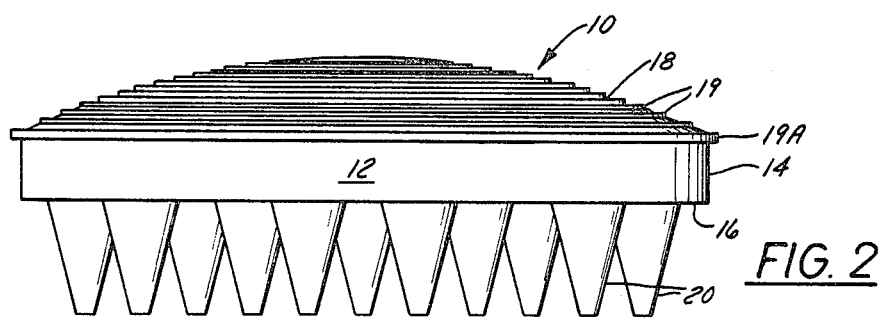
FIG. 2 is a side elevational view of the brush of FIG. 1.
Figure 3:
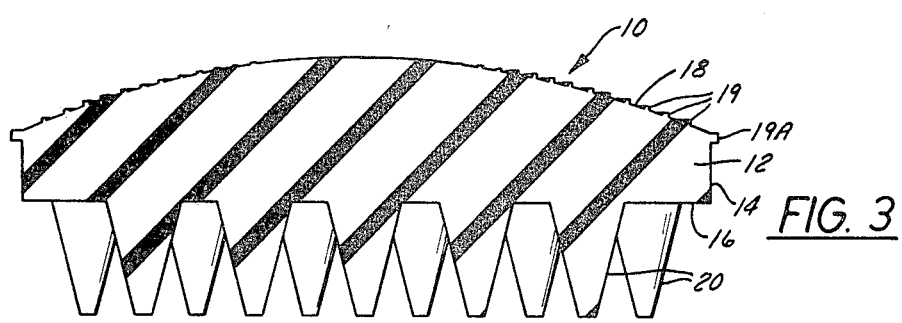
FIG. 3 is a cross-section view of the brush taken on line 3—3 of FIG. 1.

Referring to FIG. 1 through 5, the numeral 10 designates a one-piece brush in accordance with the invention for grooming animals such as horses, cattle, or the like. Brush 10 comprises a generally cylindrical middle or body portion 12 having a straight peripheral outer edge surface 14 (about 7/16" high), a flat circular lower surface 16 (about 4½" in diameter), and a hemisherical or dome-shaped upper surface 18 (about ½" high at its highest center point). Surface 18 is provided with integrally formed projecting concentric rings or ridges 19, spaced about ⅛" apart, to facilitate gripping of the brush 10 by the hand of the user. The lowermost ring 19A projects slightly beyond the peripheral edge or side 14 of body 12 and is grippable by the finger tips of the user, thereby aiding his grip. This ring 19A is located about midway between the top of the dome-shaped upper surface and flat surface 16.

Figure 4:
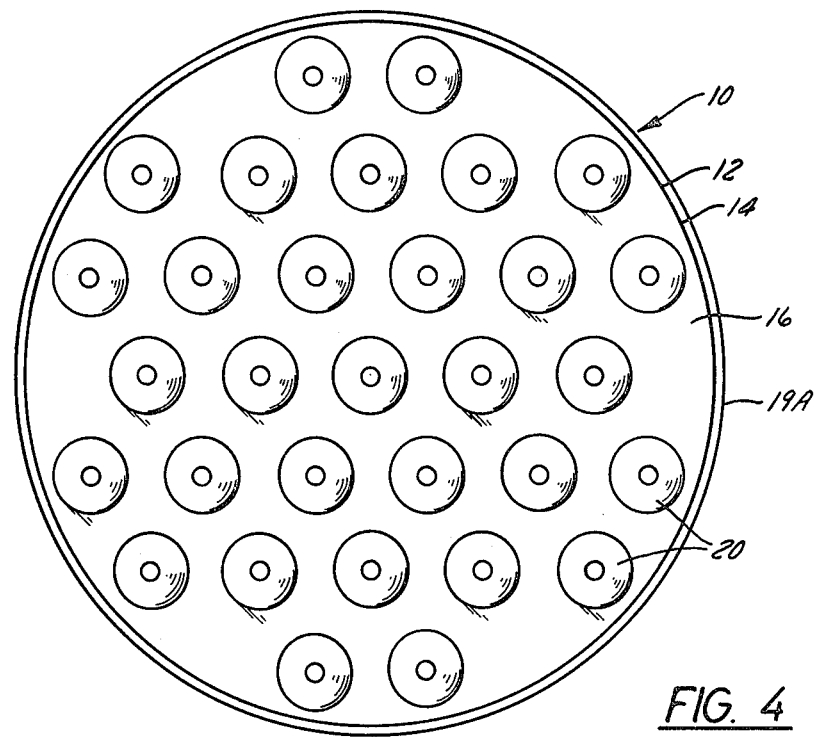
FIG. 4 is an enlarged bottom plan view of the brush shown in FIGS. 1, 2, and 3.

Brush 10 furth comprises a plurality of conically shaped teeth, such as tooth 20, which are integrally formed with body portion 12 and project from surface 16. Each tooth 20 is about ¾" long, about ½" in diameter at its widest upper or base portion, and about ⅛" in diameter at its narrowest and slightly flattened lower end portion. As FIG. 4 shows, thirty-one teeth 20 are provided and arranged in rows with the center line of each tooth 20 being spaced about ¾" from the center line of each adjacent tooth.

Figure 5:
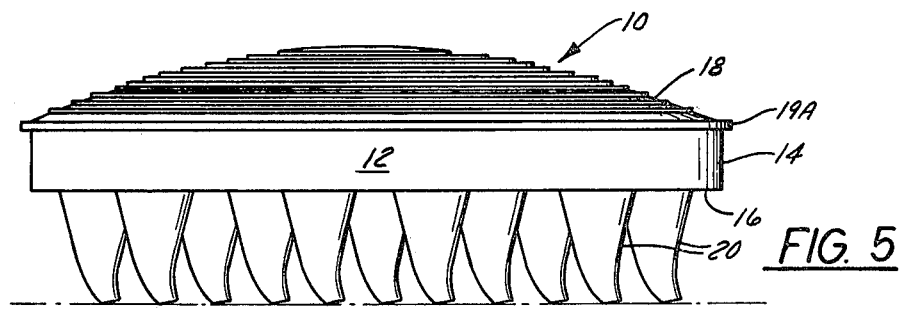
FIG. 5 is a side elevational view of aportion of the brush and showing some teeth thereof deflected as during use.

As FIG. 5 shows, when brush 10 is in use and downward pressure is applied thereto by the hand of the user, the teeth 20 can flex sideways as shown in the appropriate direction. If the brush 10 is moved in a circular direction, the teeth 20 also then flex in a circular direction.

Brush 10 is preferably fabricated by molding in one piece in an appropriately shaped mold (not shown) under heat and pressure from a commercially available material such as a neoprene base polymer (polyisoprene), which is mixed by known techniques with various known and commercially available additives in such proportions so as to provide a material (a mixture or compound), which when molded and cured, produces a finished brush 10 having certain desirable physical properties. These additives are kneaded by machine into the neoprene material which, before mixing and curing (by vulcanizing) is a deformable solid.

In actual embodiments of the invention which were manufactured and tested, two different embodiments of brush 10 were fabricated, using about 360 grams of the neoprene mixture for each brush; these embodiments herein after being designated in the following table as #1 Soft And #2 Hard.

During manufacture, the mixture in the form of a blank or bar stock is placed in the mold, whereupon the mold is closed and the mixture subjected to heat (about 310° F.) and pressure (about 2400 psi) therein for about five minutes, after which the molded brush 10 is removed from the mold and placed in an oven at a temperature of about 350° F. for a post-cure of about 20 minutes.

Preferably, brushes 10 having different degrees of hardness or flexibility are fabricated of neoprene mixtures of different colors (i.e., black for soft, red for hard) to facilitate identification by the user.

The following table compares the various properties or physical characteristics of the aore-mentioned #1 Soft Brush and #2 Hard Brush, which properties were found by applicant's tests and experiments on animals to be especially effective or desirable.

| Compound | #1 | #2 |
| --- | --- | --- |
| Durometer | 55 | 65 |
| Tensile Strength, PSI | 1,500 | 1,700 |
| 300% Modulus, PSI | 250 | 350 |
| Elongation, % | 700% | 650% |
| Tear, Die O, PSI | 110 | 140 |
| Permanent Set, % | 20% | 20% |
| C.S. 22hrs. @ 212° F. | 40% | 50% |
| Color | 7.95 Black | 7.10 Red |

I claim:

1. An animal grooming brush comprising:
a solid cylindrical body portion having a flat lower surface and a dome-shaped upper surface, said dome-shaped upper surface being provided with at least one integrally formed projection extending outwardly beyond said cylindrical body portion and along a plane substantially located midway between the top of said dome-shaped upper surface and said flat lower surface to facilitate gripping of said brush, said body portion having a straight peripheral outer edge surface axially extending between said outwardly extending projection and said flat surface, said dome-shaped upper surface being further provided with a plurality of integrally formed concentrically arranged projections to facilitate gripping of said brush;
and a plurality of solid conically shaped flexible teeth integrally formed with said body portion and extending from said lower surface, each tooth having a predetermined length and the centerline of each tooth being spaced from that of an adjacent tooth by a distance substantialy equal to said predetermined length.

2. A brush according to claim 1 wherein each tooth is about ¾" long and has its centerline spaced about ¾" from the centerline of an adjacent tooth.

3. A brush according to claim 2 wherein each tooth is about ½" in diameter at its base.

4. A brush according to claim 3 wherein each tooth is about ⅛" in diameter at its tip.

5. A brush according to claim 1 or 2 or 3 or 4 wherein said body and teeth are fabricated of a neoprene base polymer.

* * * * *